US007924316B2

(12) United States Patent
Silverstein et al.

(10) Patent No.: US 7,924,316 B2
(45) Date of Patent: Apr. 12, 2011

(54) IMAGE FEATURE IDENTIFICATION AND MOTION COMPENSATION APPARATUS, SYSTEMS, AND METHODS

(75) Inventors: Amnon Silverstein, Mountain View, CA (US); Sheng Lin, Sunnyvale, CA (US); Dong Li, Cupertino, CA (US)

(73) Assignee: Aptina Imaging Corporation, George Town (KY)

( * ) Notice: Subject to any disclaimer, the term of this patent is extended or adjusted under 35 U.S.C. 154(b) by 987 days.

(21) Appl. No.: 11/717,954

(22) Filed: Mar. 14, 2007

(65) Prior Publication Data

US 2008/0225125 A1  Sep. 18, 2008

(51) Int. Cl.
*H04N 5/228* (2006.01)

(52) U.S. Cl. .................................... 348/208.4

(58) Field of Classification Search ............. 348/208.1
See application file for complete search history.

(56) References Cited

U.S. PATENT DOCUMENTS

| 4,445,118 | A | 4/1984 | Taylor et al. |
| 4,635,203 | A | 1/1987 | Merchant |
| 5,410,346 | A | 4/1995 | Saneyoshi et al. |
| 5,535,288 | A | 7/1996 | Chen et al. |
| 5,579,444 | A | 11/1996 | Dalziel et al. |
| 5,768,430 | A | 6/1998 | Takashima et al. |
| 5,777,756 | A | 7/1998 | Hidari |
| 6,285,801 | B1 | 9/2001 | Mancuso et al. |
| 6,289,112 | B1 | 9/2001 | Jain et al. |
| 6,408,101 | B1 | 6/2002 | Krishnamurthy et al. |
| 6,590,937 | B1 | 7/2003 | Ogura et al. |
| 6,658,145 | B1 * | 12/2003 | Silver et al. ................ 382/149 |
| 6,678,590 | B1 | 1/2004 | Burchfiel |
| 6,778,210 | B1 * | 8/2004 | Sugahara et al. .......... 348/208.4 |
| 6,862,369 | B2 | 3/2005 | Kondo |
| 6,909,797 | B2 | 6/2005 | Romsdahl et al. |
| 6,912,310 | B1 | 6/2005 | Park et al. |
| 7,054,367 | B2 | 5/2006 | Oguz et al. |
| 7,315,324 | B2 * | 1/2008 | Cleveland et al. ......... 348/208.4 |
| 7,463,284 | B2 * | 12/2008 | Tamamura ................ 348/208.1 |

(Continued)

FOREIGN PATENT DOCUMENTS

EP 0811951 A2 12/1997

(Continued)

OTHER PUBLICATIONS

Jing, Xiao-Yuan, et al., "A Face and Palmprint Recognition Approach Based on Discriminant DCT Feature Extraction", *IEEE Transactions on Systems, Man and Cybernetics, Part B*, 34(6), (Dec. 2004),2405-2415.

(Continued)

*Primary Examiner* — Lin Ye
*Assistant Examiner* — Amy Hsu
(74) *Attorney, Agent, or Firm* — David C. Kellogg

(57) ABSTRACT

Apparatus, systems, and methods disclosed herein may estimate the magnitude of relative motion between a scene and an image capture device used to capture the scene. Some embodiments may utilize discrete cosine transform and/or Sobel gradient techniques to identify one or more blocks of pixels in an originating calibration image frame. Matching blocks of pixels may be located in a successive calibration image frame. Motion vectors originating at one calibration frame and terminating at the other calibration frame may be calculated. The magnitude of relative motion derived thereby may be used to adjust image capture parameters associated with the image capture device, including exposure settings.

2 Claims, 12 Drawing Sheets

U.S. PATENT DOCUMENTS

| | | | |
|---|---|---|---|
| 7,509,038 B2* | 3/2009 | Poon et al. | 396/52 |
| 7,542,614 B2 | 6/2009 | Silverstein et al. | |
| 7,557,832 B2* | 7/2009 | Lindenstruth et al. | 348/208.99 |
| 7,598,979 B2* | 10/2009 | Trutna et al. | 348/208.4 |
| 7,619,656 B2* | 11/2009 | Ben-Ezra et al. | 348/208.4 |
| 7,656,428 B2* | 2/2010 | Trutna, Jr. | 348/208.1 |
| 7,664,382 B2* | 2/2010 | Yamasaki | 396/55 |
| 7,664,392 B2* | 2/2010 | Deguchi et al. | 398/15 |
| 2002/0149693 A1* | 10/2002 | Tantalo et al. | 348/362 |
| 2003/0117511 A1 | 6/2003 | Belz et al. | |
| 2003/0138149 A1 | 7/2003 | Iizuka et al. | |
| 2003/0174772 A1* | 9/2003 | Voronov et al. | 375/240.06 |
| 2004/0239795 A1 | 12/2004 | Kitajima | |
| 2006/0017814 A1* | 1/2006 | Pinto et al. | 348/208.4 |
| 2006/0056835 A1 | 3/2006 | Poon et al. | |
| 2006/0088191 A1 | 4/2006 | Zhang et al. | |
| 2007/0014368 A1 | 1/2007 | MacInnis et al. | |
| 2007/0237506 A1* | 10/2007 | Minema et al. | 396/52 |
| 2008/0101786 A1* | 5/2008 | Pozniansky et al. | 396/159 |
| 2008/0226184 A1 | 9/2008 | Silverstein et al. | |
| 2008/0226192 A1 | 9/2008 | Silverstein et al. | |
| 2008/0260265 A1 | 10/2008 | Silverstein et al. | |

FOREIGN PATENT DOCUMENTS

| | | | |
|---|---|---|---|
| EP | 1024456 A2 | 8/2000 | |
| EP | 1480170 A1 | 11/2004 | |
| GB | 2418090 A1 | 3/2006 | |
| WO | WO-9941912 A2 | 8/1999 | |
| WO | WO-2006070046 A1 | 7/2006 | |
| WO | WO-2008/112315 A3 | 9/2008 | |
| WO | WO-2008112315 A2 | 9/2008 | |
| WO | WO-2008/133898 A1 | 11/2008 | |

OTHER PUBLICATIONS

Ye, G., et al., "Efficient multi-image registration with illumination and lens distortion correction", *IEEE International Conference on Image Processing*, 2005, ICIP 2005, vol. 3, (2005),III - 1108-11.

Zhu, Ce, et al., "An Enhanced Hexagonal Search Algorithm for Block Motion Estimation", *ISCAS '03. Proceedings of the 2003 International Symposium*, vol. 2, (May 25-28, 2003),II-392-II-395.

"International Application Serial No. PCT/US2008/003461, International Search Report mailed Nov. 17, 2008", 6 pages.

"International Application Serial No. PCT/US2008/003461, Written Opinion mailed Nov. 17, 2008", 14 pages.

Brailean, J. C, et al., "Noise reduction filters for dynamic image sequences : A Review", *Proceedings of the IEEE*, New York ,US, (1995), 1272-1291.

Cheng-Hsien, L., et al., "Ultrasound image compounding based on motion compensation", *Engineering in medicine and biology society*, (2005), 6445-6448.

Song, B. C, et al., "Motion compensated temporal filtering for denoising in video encoder", *Electronics letters, lee Stevenage, GB*, vol. 40(13), (2004), 802-804.

Zlokolica, V., et al., "Recursive temporal denoising and motion estimation of video", *Image processing, ICIP*, vol. 3, (2004), 1465-1468.

\* cited by examiner

IMAGE FEATURE IDENTIFICATION AND MOTION COMPENSATION APPARATUS, SYSTEMS, AND METHODS

TECHNICAL FIELD

Various embodiments described herein relate to apparatus, systems, and methods associated with imaging, including automatic exposure adjustment.

BACKGROUND INFORMATION

As megapixel counts grow and pixel dimensions shrink in the field of digital imaging, longer exposure integration times may be required for a given brightness of scene lighting. However, if an exposure is too long, camera motion may result in a blurred photograph.

A camera or other image capture device may measure available light and conservatively decrease exposure times in an attempt to reduce blur due to camera motion, motion in the scene, or both. The imaging device may increase a lens aperture diameter to compensate for the reduced exposure time, resulting in a shorter depth of field. An out-of-focus image may be captured as a result.

In low light conditions, the camera may reach the wide extreme of the available aperture adjustment range without reaching an exposure time sufficiently short to avoid a blurred image according to the conservative exposure algorithms in common use. Under such conditions the camera may risk blur by increasing the exposure time. Alternatively, a dark image may be captured, possibly resulting in an unacceptable level of pixel noise. As a third alternative, the camera may simply disable image capture under such low light conditions. Thus, a need exists for a more refined approach to exposure setting adjustment to avoid blurred images due to relative movement between an image capture device and a scene to be captured.

DETAILED DESCRIPTION

Figure 1:
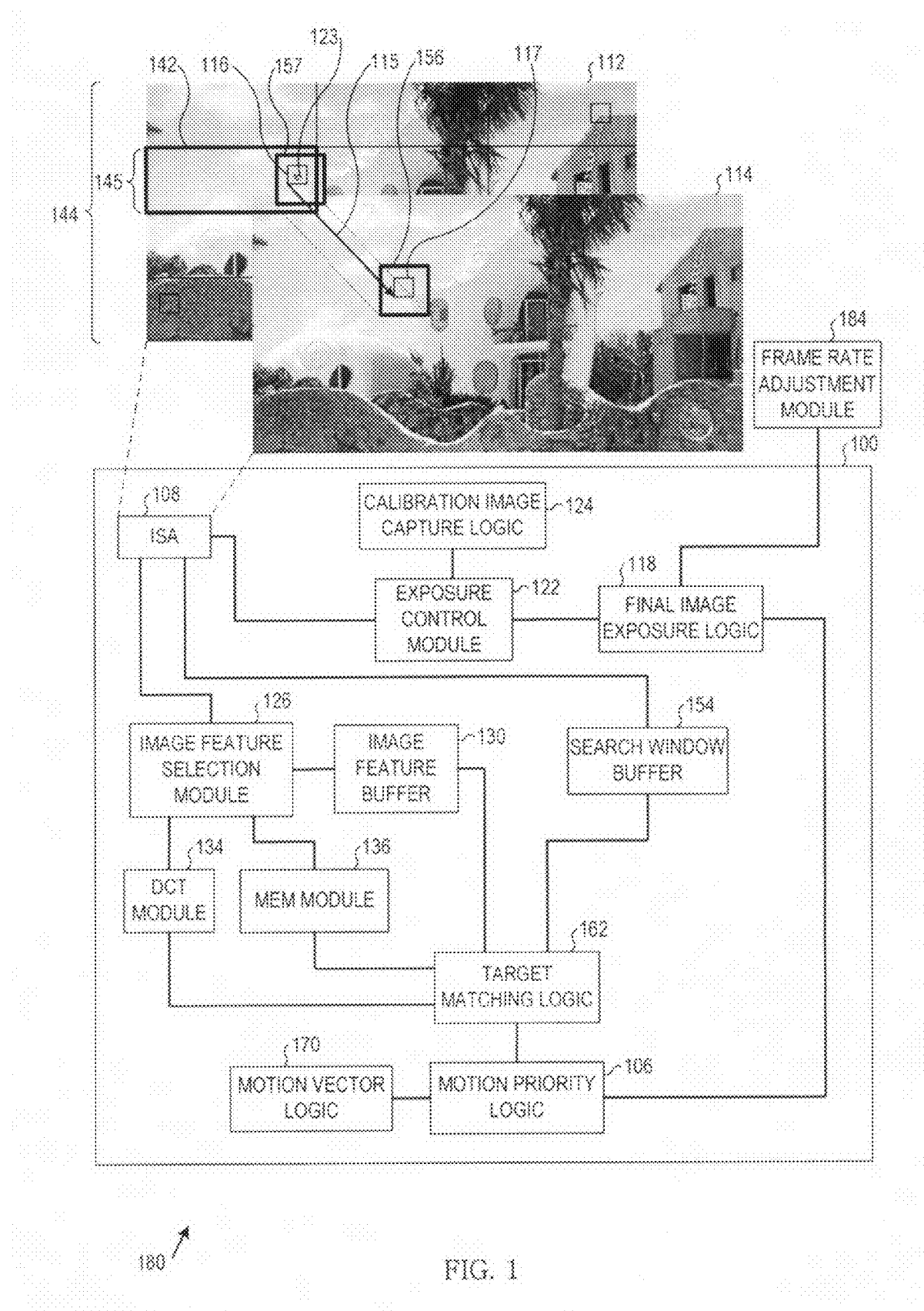
FIG. 1 is a block diagram of an apparatus and a system according to various embodiments of the invention.

FIG. 1 is a schematic and block diagram of an apparatus 100 and a system 180 according to various embodiments of the present invention. For conciseness and clarity, the apparatus 100 will be described herein as being associated with an image capture device such as a digital camera. However, embodiments of the present invention may be realized in other image capture-based apparatus, systems, and applications, including cellular telephones, hand-held computers, laptop computers, desktop computers, automobiles, household appliances, medical equipment, point-of-sale equipment, and image recognition equipment, among others.

"Coupled" as used herein refers to the electrical communication or physical connection between two elements or components. Coupling may be direct or indirect. Directly coupled" means that the components recited are connected or communicate directly, with no intervening components. "Indirectly coupled" means that one or more additional components may exist in the communication or connection path between the two elements.

The apparatus 100 may operate to estimate a magnitude of relative motion between a scene and an image capture device used to capture the scene. The magnitude of the relative motion may be used to adjust image capture parameters associated with the image capture device, including exposure settings. For example, the image capture device may set an exposure time to a relatively shorter period to reduce motion in a final frame capture if a relatively larger amount of motion is estimated.

The apparatus 100 may include motion priority logic 106 to estimate the magnitude of relative motion. An image sensor array (ISA) 108 may capture multiple calibration images of a scene such as a first calibration image 112 and a second calibration image 114. Some embodiments of the motion priority logic 106 may estimate the relative motion between a time of capturing the first calibration image 112 and capturing the second calibration image 114. In some embodiments, motion may be estimated relative to one or more sets of matching blocks of pixels in each of two or more frames (e.g., the calibration images 112 and 114) captured in rapid succession. For simplicity and ease of understanding, examples below may refer to motion matching using an image block from the first calibration image 112 and an image block from the second calibration image 114. It is noted that some embodiments may use multiple image blocks from each calibration image to estimate motion.

The term "image feature" as used herein means a group of pixels spatially organized as a geometric entity (e.g., a square, a triangle, two or more line sections including a crossing of the line sections, etc.) with sufficient contrast relative to a set of background pixels such as to be recognizable and distinguishable from the set of background pixels. An image feature block as used herein is a set of pixels, usually rectangular, including pixels forming the image feature and background pixels. An image feature block may comprise an eight-by-eight pixel block; however other block sizes and shapes are contemplated within the embodiments.

A motion vector 115 may originate at a first image feature block 116 selected from the first calibration image 112 and may terminate at a second image feature block 117 selected from the second calibration image 114. As utilized in examples herein, the magnitude of relative motion between the scene and the image capture device is defined as the magnitude of the motion vector 115. However it is noted that other embodiments of the current invention may utilize motion vector magnitude and direction to represent the relative motion between the scene and the image capture device. The magnitude of the motion vector 115 may be used to calculate exposure parameters to produce a desirable trade-off between scene blurring and noise caused by a short exposure time.

The apparatus 100 may include final image exposure logic 118 coupled to the motion priority logic 106. The final image exposure logic 118 may use the magnitude of relative motion as calculated by the motion priority logic 106 to determine one or more exposure settings (e.g., image integration time, aperture size, etc.) as previously described. An exposure control module 122 may be coupled to the final image exposure logic 118 and to the ISA 108. The exposure control module 122 may adjust the exposure settings.

The apparatus 100 may also include calibration image capture logic 124 coupled to the exposure control module 122. The calibration image capture logic 124 may calculate a calibration exposure time used to capture the first calibration image 112 and the second calibration image 114. The calibration exposure time may be calculated to decrease blur due to image motion while providing sufficient image feature detail to calculate values of an image feature strength metric.

The term "image feature strength," as utilized herein, means a measure of one or more characteristics associated with an image feature (e.g., the image feature 123) that render the image feature distinguishable from other image features and from the set of background pixels. Thus for example, a low image feature strength may be associated with a line segment standing alone in a sample pixel block. Such line segment may be ambiguous and difficult to distinguish from other line segments associated with the same line. On the other hand, a high image feature strength may be associated with a junction of crossing lines in a sample pixel block. In the latter case, line crossing angles may serve to distinguish a particular junction of crossing lines from other such junctions.

If the calibration image capture logic 124 sets the calibration exposure time too long, image feature details may be blurred in one or more of the calibration images 112 and 114. Blurred image feature details may frustrate efforts to identify image features for motion vector calculation purposes. On the other hand, if the calibration image capture logic 124 sets the calibration exposure time too short, the resulting calibration images 112, 114 may be so dark that image feature contrast may be insufficient to permit reliable image feature detection. Under low-light conditions, some embodiments may set the calibration image exposure time to be short relative to a non-calibration exposure time such that image feature detail is retained only in highlighted areas. A sufficient number of image features may be found in the highlighted areas to enable reliable motion vector calculation while reducing blur in the calibration images 112, 114 due to the motion.

The apparatus 100 may include an image feature selection module 126 coupled to the ISA 108. The image feature selection module 126 may be used to identify one or more image features (e.g., the image feature 123) in the first calibration image 112. The image feature selection module 126 may store a block of pixels (e.g., the block of pixels 116) containing an identified image feature in an image feature buffer 130. The image feature block of pixels may be used in motion calculation operations.

It is desirable to select image features with a high strength, as previously described. Image feature strength metric values may be calculated for one or more candidate image feature blocks of pixels using a variety of apparatus and methods. A discrete cosine transform (DCT) module 134 may be coupled to the image feature selection module 126 to determine image feature strength. Alternatively, or in addition to the DCT module 134, a multiple edge module (MEM) 136 may be coupled to the image feature selection module 126 to determine image feature strength. The DCT module 134 and the MEM module 136 are discussed in substantial detail further below.

The DCT module 134 and/or the MEM module 136 may perform feature strength measurement operations on luminance values associated with candidate image feature blocks of pixels. A block of pixels with a high image feature strength metric value (e.g., the image feature block of pixels 116) may be selected from each of several sub-regions (e.g., the sub-region 142) of the first calibration image 112. The sub-region 142 may be selected from a set of sub-regions distributed according to a variety of designs. For example, the image frame may be divided into a set of horizontal bands 144. The set of sub-regions may be selected such that a single sub-region (e.g., the sub-region 142) is located in each horizontal band (e.g., the horizontal band 145) of the set of horizontal bands 144.

Other schemes for choosing sub-regions may also result in a selection of strong image feature blocks from areas distributed across the first calibration image 112. Thus distributed, the strong image feature blocks may serve as origins for a set of motion vectors (e.g., the motion vector 115). Each motion vector may terminate at a corresponding image feature block (e.g. the image feature block 117) of the second calibration image 114.

For simplicity and ease of understanding, examples below may refer to motion matching using an image feature block from the first calibration image 112 and an image feature block from the second calibration image 114. It is again noted that some embodiments may use multiple image blocks from each of several calibration images to estimate motion.

The apparatus 100 may search for the image feature block 117 using a search window buffer 154 coupled to the ISA 108. The search window buffer 154 may store a set of pixels from an area 156 of the second calibration image 114. The area 156 may correspond to an area 157 of the first calibration image 112 wherein the image feature block 116 is located. That is, the area 156 may represent a "search window" within which the second image feature block 117 may be expected to be found. In some embodiments, the search window may be centered at a coordinate position corresponding to the center of the first image feature block 116. The size of the search window may be selected such that the second image feature block 117 falls within the search window for expected magnitudes of relative motion between the image capture device and the scene. The area 156 may be stored for feature localization analysis.

Target matching logic 162 may be coupled to the motion priority logic 106. The target matching logic 162 searches the area 156 to find the second image feature block 117 in the second calibration image 114. That is, the target matching logic 162 searches the area 156 for a candidate image feature block with a bitmap that is a best match to a bitmap corresponding to the first image feature block 116. More specifically, the target matching logic 162 searches the area 156 for a set of spatially arranged luminance values closer in magnitude to the set of spatially arranged luminance values associated with the first image feature block 116 than any other set of spatially arranged luminance values within the area 156. Some embodiments may calculate mismatch in this context as a sum of absolute differences between luminance values of the candidate image feature block and the first image feature block 116. Other embodiments may use other metrics (e.g., sum of squares of differences) as measures of mismatch.

The apparatus 100 may also include motion vector logic 170 coupled to the motion priority logic 106. The motion vector logic 170 may calculate the magnitude of a motion vector (e.g., the motion vector 115) associated with an image feature block (e.g., the first image feature block 116). The motion vector magnitude may be calculated as the relative distance between the location of the first image feature block 116 in the first calibration image 112 and the location of the second image feature block 117 in the second calibration image 114 divided by the period of time between capturing the first calibration image 112 and capturing the second calibration image 114. Various motion vectors may be calculated, each associated with a first image feature block identified within each of several areas of the first calibration image 112 and each associated with a corresponding best match image feature block located within search windows (e.g., the area 156) of the second calibration image 114.

The apparatus 100 may also include the final image exposure logic 118 coupled to the motion priority logic 106, as previously described. The final image exposure logic 118 may use the magnitudes of the motion vectors (e.g., the magnitude of the motion vector 115) to calculate the adjustment of one or more exposure settings associated with the image capture device. The exposure control module 122 may subsequently adjust the exposure settings to limit image blur to a maximum acceptable amount.

In another embodiment, a system 180 may include one or more of the apparatus 100. The system 180 may also include a frame rate adjustment module 184 operatively coupled to the final image exposure logic 118. The frame rate adjustment module 184 may adjust a frame rate (e.g., a rate at which frames are acquired by the system 180) according to the above-described exposure parameter adjustments. In some embodiments, the frame rate adjustment module 184 may be adapted to adjust a frame rate associated with a multi-shot still-frame camera sequence. The frame rate adjustment module 184 may also be incorporated into a video camera to adjust a frame rate associated with a video sequence.

The DCT module 134 of FIG. 1 operates as one means of deriving a value of the image feature strength metric associated with the block of pixels 116, as previously mentioned and as described in detail here below. The DCT may comprise one or more of a Type I DCT, a Type II DCT, a Type III DCT, or a Type IV DCT. Additional information regarding DCT operations of the various types may be found in Kamisetty Ramamohan Rao, P. Yip, "Discrete Cosine Transform: Algorithms, Advantages, Applications" (1990).

Figure 2:
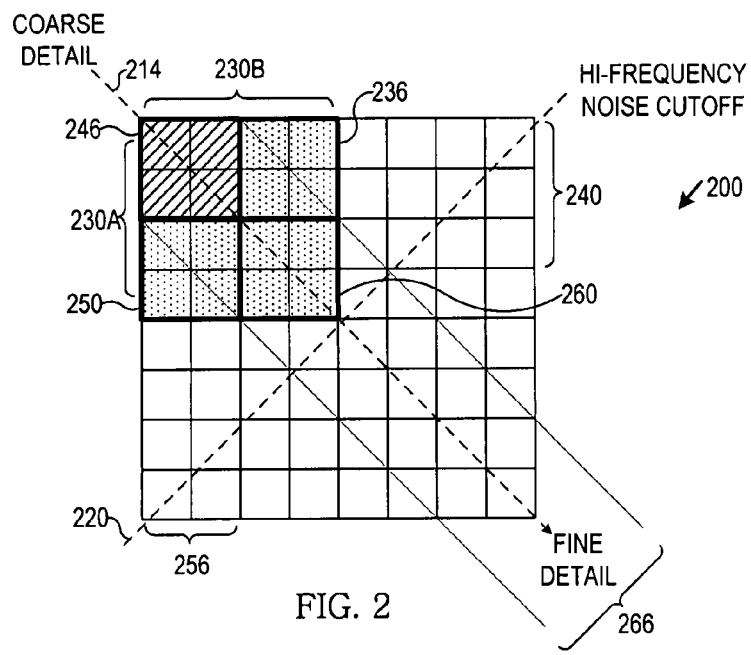
FIG. 2 is a conceptual diagram of a discrete cosine transform (DCT) coefficient matrix according to various embodiments of the invention.

FIG. 2 is a conceptual diagram of a discrete cosine transform (DCT) coefficient matrix 200 according to various embodiments of the present invention. The matrix 200 results from performing a DCT operation on the set of luminance values associated with the block of pixels 116. A conceptual granularity continuum line 214 is shown to span the DCT coefficient matrix 200 from upper left to lower right. Coefficients located toward the upper-left portion of the matrix 200 may represent coarse detail in the block of pixels 116. Coefficients located in the lower-right portion of the matrix 200 may represent fine detail in the block of pixels 116. A conceptual high-frequency noise cutoff line 220 is shown to span the matrix 200 from lower-left to upper-right. Embodiments herein may operate to make image feature selection decisions based upon, or weighted toward, coarse-detail DCT coefficients. Such a strategy may operate to decrease or avoid erroneous decisions caused by noise artifacts.

Figure 3:
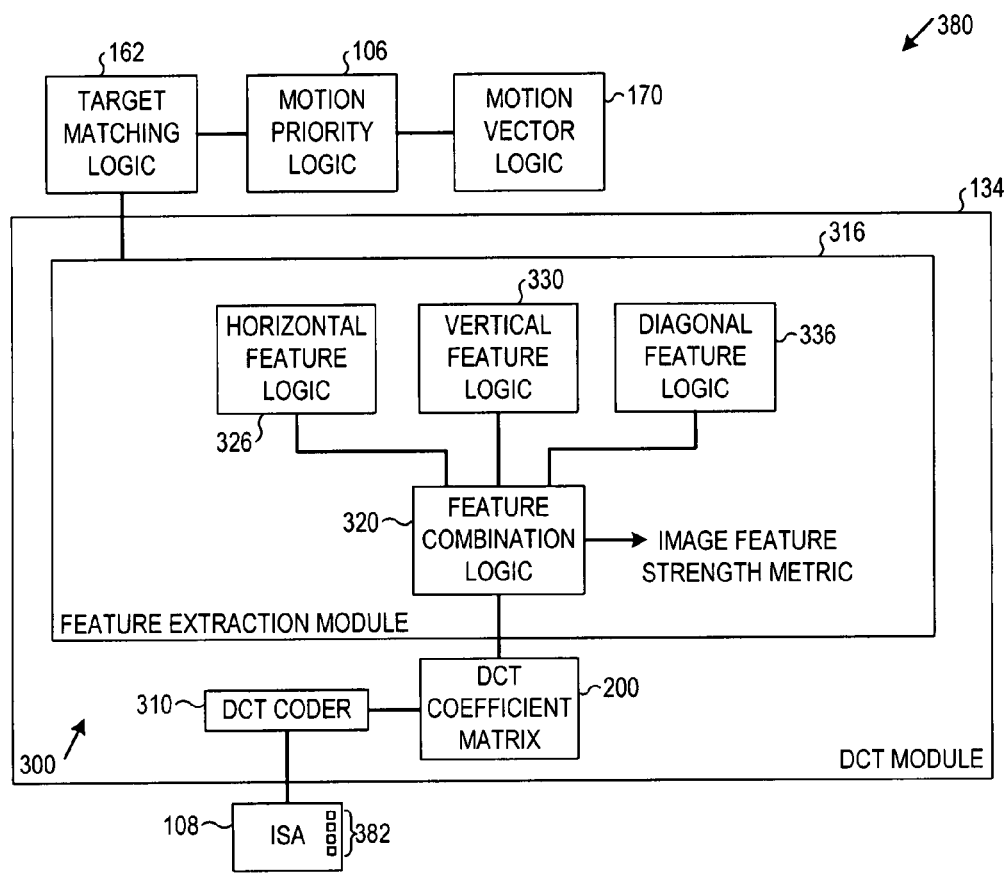
FIG. 3 is a block diagram of an apparatus and a system according to various embodiments of the invention.

FIG. 3 is a block diagram of an apparatus 300 and a system 380 according to various embodiments of the present invention. The DCT module 134 (FIG. 1) may comprise the apparatus 300. Referring now to FIGS. 2 and 3, it can be seen that the apparatus 300 may include a DCT coder module 310. The DCT coder module 310 may perform a DCT operation on a set of luminance values associated with a block of pixels (e.g., the image feature block of pixels 116 of FIG. 1) selected from an image (e.g., the first calibration image 112 of FIG. 1) to obtain the DCT coefficient matrix 200.

The apparatus 300 may also include a feature extraction module 316 operatively coupled to the DCT coder module 310. The feature extraction module 316 may perform operations on a plurality of DCT coefficients selected from low-frequency bands 230A and 230B of the DCT coefficient matrix 200. The term "low-frequency bands" as used herein means areas in the upper-left quadrant of the DCT coefficient matrix 200. The feature extraction module 316 may utilize results of the DCT operation to derive a value of the image feature strength metric associated with the block of pixels 116.

The feature extraction module 316 may include feature combination logic 320 operatively coupled to the DCT coder 310. The feature combination logic 320 may calculate a mathematical function of a horizontal component of the image feature strength metric, a vertical component of the image feature strength metric, a diagonal component of the image feature strength metric, or some combination of these.

The feature extraction module 316 may also include horizontal feature logic 326 coupled to the feature combination logic 320. The horizontal feature logic 326 may perform a mathematical operation on DCT coefficients from a DCT coefficient sub-matrix 236 to obtain the horizontal component of the image feature strength metric. In some embodiments, the mathematical operation may comprise a sum. The DCT coefficient sub-matrix 236 may be located in a horizontal band 240 of the DCT coefficient matrix 200 adjacent a lowest-frequency sub-matrix 246.

Vertical feature logic 330 may also be coupled to the feature combination logic 320. The vertical feature logic 330 may perform a mathematical operation on DCT coefficients from a DCT coefficient sub-matrix 250 to obtain the vertical component of the image feature strength metric. In some embodiments, the mathematical operation may comprise a sum. The DCT coefficient sub-matrix 250 may be located in a vertical band 256 of the DCT coefficient matrix 200 adjacent the lowest-frequency sub-matrix 246.

The feature extraction module 316 may further include diagonal feature logic 336 coupled to the feature combination logic 320. The diagonal feature logic 336 may perform a mathematical operation on DCT coefficients from a DCT coefficient sub-matrix 260 to obtain the diagonal component of the image feature strength metric. In some embodiments, the mathematical operation may comprise a sum. The DCT coefficient sub-matrix 260 may be located in a diagonal band 266 of the DCT coefficient matrix 200, diagonally adjacent the lowest-frequency sub-matrix 246.

In some embodiments, a system 380 may include one or more of the apparatus 300, including a feature extraction module 316. That is, the apparatus 300 may be incorporated into the system 380 as a component. The system 380 may comprise a digital camera, a digital imaging software product (e.g., graphic design software, video editing software, or vehicle accident simulation software, among others), or a vehicle system. In the latter example, the vehicle system may comprise a navigation system or a collision avoidance system, for example.

The system 380 may also include an ISA 108. The ISA 108 may detect luminance incident to a set of ISA elements 382. The ISA 108 may transform the luminance to create a set of luminance values associated with a pixel representation of an image. The system 380 may also include a DCT coder 310 coupled to the ISA 108. The DCT coder 310 may perform a DCT operation on a subset of the set of luminance values associated with a block of pixels selected from the image. The DCT operation may result in a DCT coefficient matrix (e.g., the DCT coefficient matrix 200).

The system 380 may further include target matching logic 162 coupled to the feature extraction module 316. The target matching logic 162 may correlate a first image feature block of pixels (e.g., the image feature block 116 of FIG. 1) as identified from a first image or from an image database to a second image feature block as searched for in a target image.

The system 380 may also include motion priority logic 106 coupled to the target matching logic 162. The motion priority logic 106 may estimate a magnitude of relative motion between a scene and the ISA 108. The relative motion may occur during the period of time between capturing a first image of the scene (e.g., the image 112 of FIG. 1) and capturing a second image of the scene (e.g., the image 114 of FIG. 1).

The system 380 may further include motion vector logic 170 coupled to the motion priority logic 106. The motion vector logic 170 may calculate the magnitude of a motion vector (e.g., the magnitude of the motion vector 115 of FIG. 1) associated with the first image feature block (e.g., the image feature block 116 of FIG. 1) selected from the first image of the scene. The magnitude of the motion vector 115 may be calculated as a relative distance between a location of the first image feature block in the first image and a location of the second image feature block in the second image divided by the period of time between capturing the first image and capturing the second image. The locations of the image feature blocks in the first and second images may be measured relative to image frame boundaries associated with the respective images.

Turning back to FIG. 1, some embodiments herein may include a multiple edge metric (MEM) module 136 as an alternative or additional means of determining image feature strength, as previously mentioned and as described in detail here below. The MEM module 136 may be coupled to the image feature selection module 126 to derive a value of the alternative image feature strength metric for the image feature block of pixels 116. The MEM module 136 may perform a gradient vector analysis on the block of pixels 116 to derive the alternative image feature strength metric.

Figure 4A:
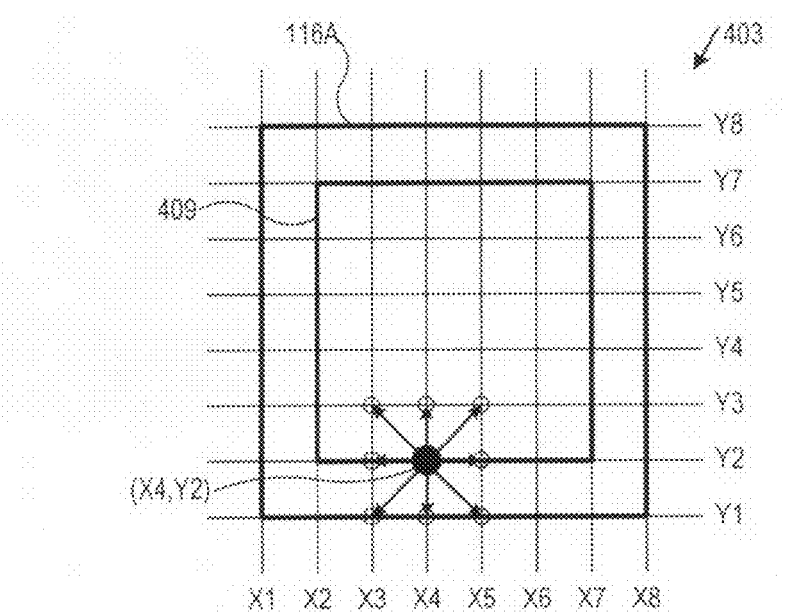
FIG. 4A is a two-dimensional matrix diagram representing a block of pixels according to various embodiments.

FIG. 4A is a two-dimensional matrix diagram of a matrix 403 representing the block of pixels 116 according to various embodiments. In some embodiments, the block of pixels 116 may comprise an eight-pixel by eight-pixel block 116A. Other block sizes are possible. Due to the nature of the gradient analysis, explained further below, the MEM module 136 may calculate gradients for a six-pixel by six-pixel block 409 interior to or forming a portion of the eight-pixel by eight-pixel block of pixels 116A.

Figure 4B:
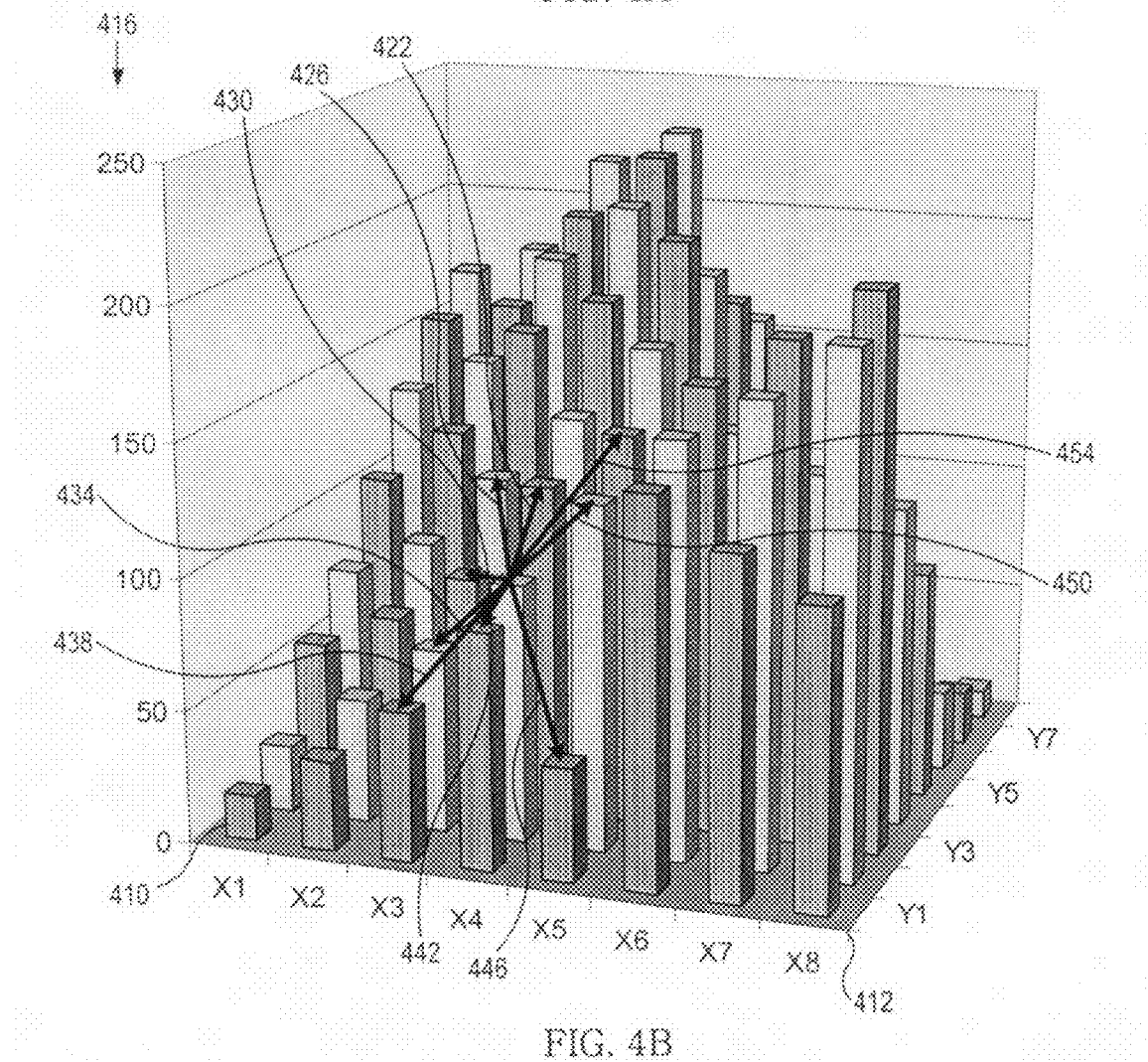
FIG. 4B is a conceptual three-dimensional gradient diagram representing a block of pixels according to various embodiments.

FIG. 4B is a conceptual three-dimensional gradient diagram representing the block of pixels 116 according to various embodiments. Each pixel of the block of pixels 116 may be represented by a column (e.g., the column 410) located on an (X,Y) grid 412. The location of each column in FIG. 4B may correspond to a location of a pixel (e.g., the pixel (X4, Y2)) in the matrix 403 associated with the block of pixels 116. The height of each column may correspond to a luminance value 416 of the associated pixel in the block of pixels 116.

For each pixel of the six-pixel by six-pixel block of pixels 409 interior to the eight-pixel by eight-pixel block of pixels 116A (e.g., the pixel (X4,Y2)), a gradient to each of eight adjacent pixels may be conceptualized. Each such gradient may be thought of as a gradient vector extending upward or downward from the top of the column representing the pixel for which the gradient is calculated ("subject pixel") to the top of the column representing the adjacent pixel. For example, eight vectors 422, 426, 430, 434, 438, 442, 446, 450, and 454 may represent the gradients from the pixel (X4, Y2) to the adjacent pixels (X4,Y3), (X3,Y3), (X3,Y2), (X3,Y1), (X4, Y1), (X5,Y1), (X5,Y2), and (X5,Y3), respectively.

In some embodiments, the MEM module 136 may operate to select a principal gradient vector (e.g., the gradient vector 446) from the eight vectors. The principal gradient vector may represent the highest gradient from the subject pixel to an adjacent pixel. That is, the vector with the steepest slope upward or downward to the corresponding adjacent pixel (e.g., the gradient vector 446 pointing downward to the adjacent pixel (X5,Y1)) may be chosen for use in vector operations performed by the MEM module 136 to derive the MEM-based image feature strength metric disclosed herein.

Figure 5:
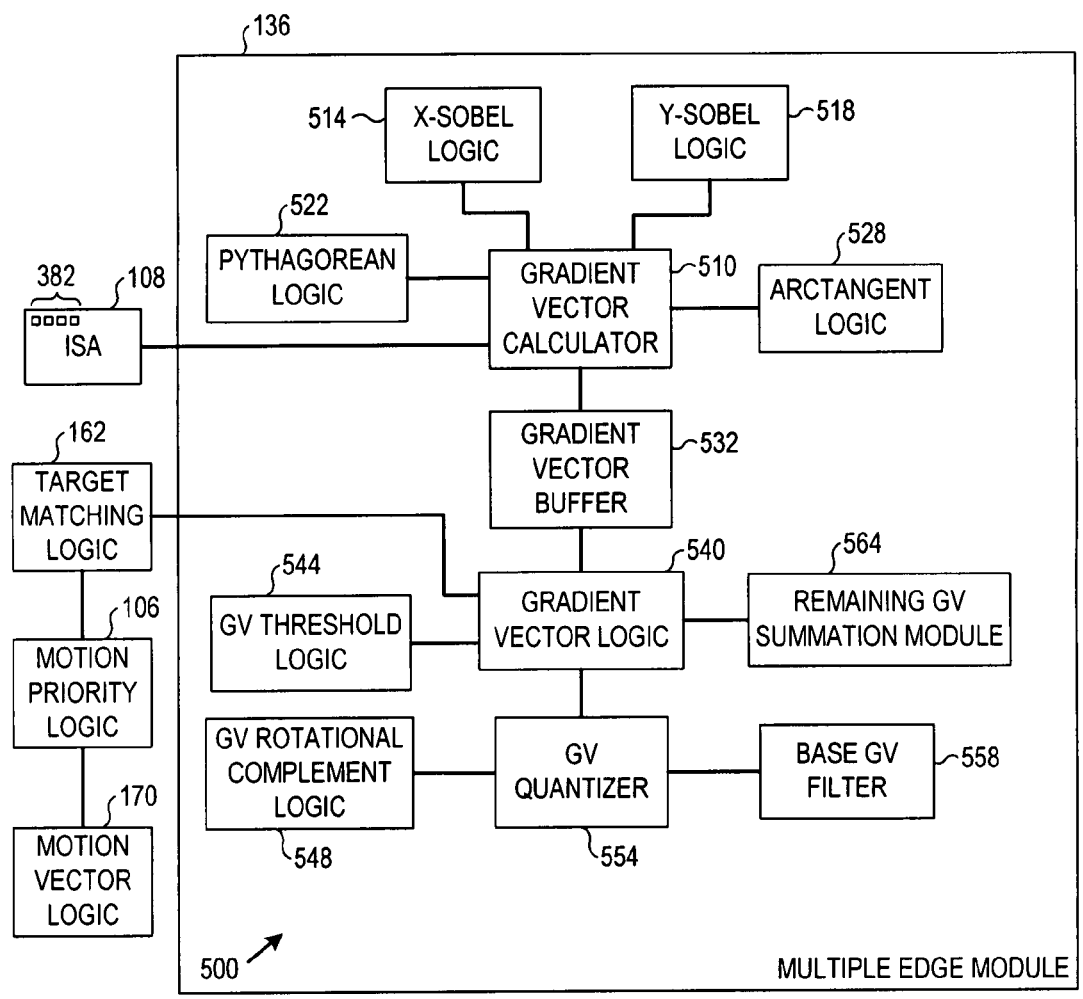
FIG. 5 is a block diagram of an apparatus 500 and a system 580 according to various embodiments of the invention.
Figure 6:
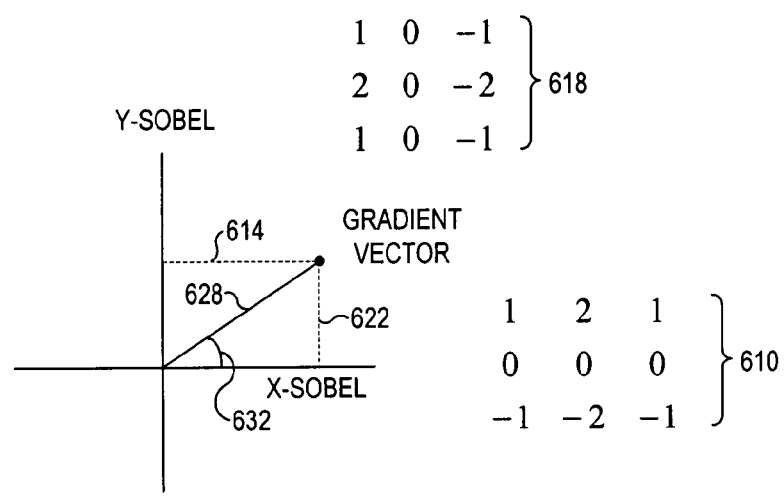
FIGS. 6-11 are gradient vector diagrams according to various embodiments.
Figure 7:
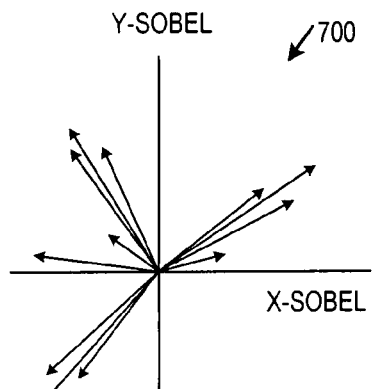
Figure 8:
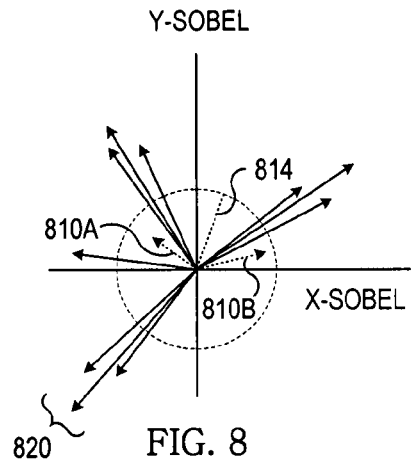
Figure 9:
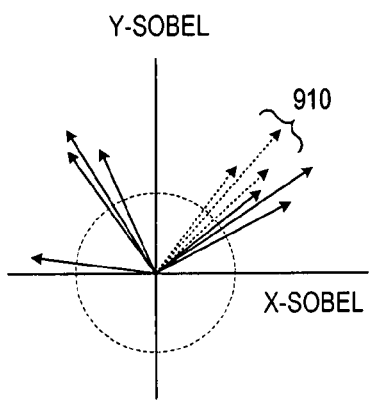
Figure 10:
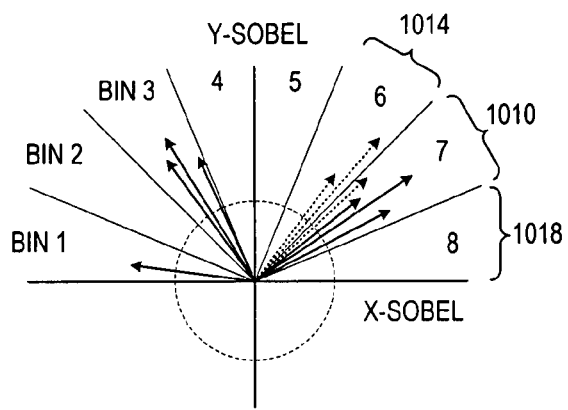
Figure 11:
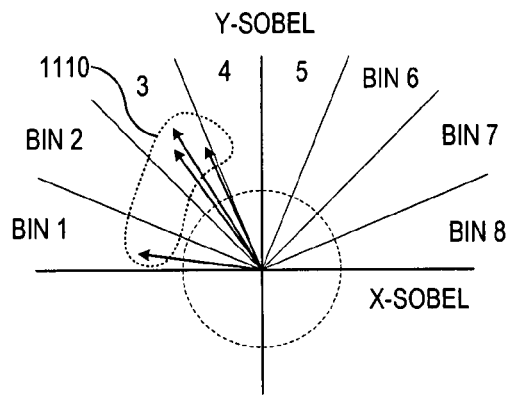

FIG. 5 is a block diagram of an apparatus 500 and a system 580 according to various embodiments of the present invention. The MEM module 136 may include the apparatus 500. In some embodiments, the apparatus 500 may perform a differentiation operation on the block of pixels 116, including perhaps a Sobel operation, to calculate the principal gradient vectors described above. Additional information regarding the Sobel operator may be found in Sobel, I., Feldman, G., "A 3×3 Isotropic Gradient Operator for Image Processing", presented at a talk at the Stanford Artificial Project in 1968, unpublished but often cited, orig. in Pattern Classification and Scene Analysis, Duda, R. and Hart, P., John Wiley and Sons, 1973, pp. 271-272.

FIGS. 6-11 are gradient vector diagrams according to various embodiments. Referring now to FIGS. 5-11, it can be seen that the apparatus 500 may include a gradient vector calculator 510. The gradient vector calculator 510 may calculate a principal gradient vector (e.g., the principal gradient vector 446 of FIG. 4B) for each pixel within the block of pixels 116 using a summation of results of a matrix convolution operation. Some embodiments may exclude pixels located along a periphery of the block of pixels 116 because some gradient vector destination pixels may fall outside of the block of pixels 116.

In some embodiments, the gradient vector calculator 510 may be configured to perform Sobel operations on each pixel within the block of pixels 116 to obtain the principal gradient vector 446. X-Sobel logic 514 may be coupled to the gradient vector calculator 510. The X-Sobel logic 514 may operate to convolve a matrix of pixel luminance values comprising the subject pixel (e.g., the pixel (X4,Y2)) and the eight pixels immediately adjacent to the subject pixel (e.g., the pixels (X4,Y3), (X3,Y3), (X3,Y2), (X3,Y1), (X4,Y1), (X5,Y1), (X5,Y2), and (X5,Y3)) by an X-Sobel matrix 610 to obtain an X-Sobel value 614. Y-Sobel logic 518 may also be coupled to the gradient vector calculator 510. The Y-Sobel logic 518 may convolve the matrix of pixel luminance values comprising luminance values associated with the subject pixel (X4,Y2) and the eight pixels immediately adjacent to the subject pixel (X4,Y2) by a Y-Sobel matrix 618 to obtain a Y-Sobel value 622.

The apparatus 500 may also include pythagorean logic 522 coupled to the gradient vector calculator 510. The pythagorean logic 522 may perform a pythagorean operation on the X-Sobel value 614 and the Y-Sobel value 622 to obtain a value 628 of the principal gradient vector 446 associated with the subject pixel (X4,Y2). Arctangent logic 528 may also be coupled to the gradient vector calculator 510. The arctangent logic 528 may perform an arctangent operation on the X-Sobel value 614 and the Y-Sobel value 622 to obtain an angle 632 of the principal gradient vector 446 associated with the subject pixel (X4,Y2). That is, the arctangent logic 528 may perform the operation: arctangent (Y-Sobel/X-Sobel).

A gradient vector buffer 532 may also be coupled to the gradient vector calculator 510. The gradient vector buffer 532 may store the principal gradient vector (e.g., the principal gradient vector 446) for each pixel within the block of pixels 116, possibly excluding the pixels located along the periphery of the block of pixels 116.

The apparatus 500 may also include gradient vector logic 540 operatively coupled to the gradient vector calculator 510. The gradient vector logic 540 may perform the gradient vector analysis on a resulting plurality of principal gradient vectors 700 to derive the value of the image feature strength metric associated with the block of pixels 116.

Gradient vector threshold logic 544 may be coupled to the gradient vector logic 540. The gradient vector threshold logic 544 may operate to discard resulting principal gradient vectors 810A and 810B smaller than a threshold magnitude 814. The discarded principal gradient vectors 81 OA and 81 OB may represent weak gradients that are not major contributors to strong feature identification.

The apparatus 500 may also include gradient vector rotational complement logic 548 coupled to the gradient vector logic 540. The gradient vector rotational complement logic 548 may operate to rotate gradient vectors 820 falling below the X axis by 180 degrees, resulting in vectors 910. A gradient vector quantizer 554 may also be coupled to the gradient vector logic 540. The gradient vector quantizer 554 may quantize remaining gradient vectors into bins (e.g., the bins 1-8 of FIG. 10) comprising ranges of vector angles. Although the example embodiment utilizes eight bins, some embodiments may use a different number of bins.

The apparatus 500 may further include a base gradient vector filter 558 coupled to the gradient vector logic 540. The base gradient vector filter 558 may discard remaining gradient vectors from a bin 1010 containing more of the remaining gradient vectors than any other bin. Remaining gradient vectors from immediately adjacent bins 1014 and 1018 may also be discarded. After discarding the vectors in and around the most highly populated bin, a final set of gradient vectors 1110 may remain in one or more bins (e.g., in the bins I and 3 in the example illustrated in FIG. 11).

A remaining gradient vector summation module 564 may be coupled to the gradient vector logic 540. The remaining gradient vector summation module 564 may count the number of gradient vectors in the final set of gradient vectors 1110 to obtain the value of the image feature strength metric associated with the block of pixels 116. Thus, in the example illustrated by FIGS. 6-11, the feature strength metric is equal to four. Conceptually, embodiments utilizing the MEM technique may accord a high metric value to features with a large number of strong gradients corresponding to lines in an image that cross each other. Vectors discarded from the most populated bin and from the two bins adjacent to the most populated bin may represent a line or other first sub-feature in an image. The number of remaining vectors may represent a strength of one or more second sub-features crossing the first sub-feature.

In another embodiment, a system 580 may include one or more of the apparatus 500. That is, the apparatus 500 may be incorporated into the system 580 as a component. The system 580 may comprise a digital camera, a digital imaging software product, or a vehicle system. In the latter example, the vehicle system may comprise a navigation system or a collision avoidance system.

The system 580 may also include an ISA 108. The ISA 108 may detect luminance incident to a set of ISA elements 382.

The ISA 108 may transform the luminance to create a set of luminance values associated with a pixel representation of an image. The system 380 may further include a gradient vector calculator 510 coupled to the ISA 108. The gradient vector calculator 510 may calculate a principal gradient vector (e.g., the principal gradient vector 446 of FIG. 4B) for each pixel within the block of pixels 116. Some embodiments may exclude pixels located along a periphery of the block of pixels 116, as previously described.

The system 580 may also include gradient vector logic 540 operatively coupled to the gradient vector calculator 510. The gradient vector logic 540 may perform the gradient vector analysis on the resulting plurality of principal gradient vectors 700 to derive the value of the image feature strength metric associated with the image feature block of pixels 116, as previously described.

The system 580 may further include target matching logic 162 coupled to the gradient vector logic 540. The target matching logic 162 may correlate a first image feature block (e.g., the first image feature block 116 of FIG. 1) as identified from a first image (e.g., the first image 112 of FIG. 1) or from an image database to a second image feature block (e.g., the second image feature block 117 of FIG. 1) as searched for in a target image.

The system 580 may also include motion priority logic 106 operatively coupled to the gradient vector logic 540. The motion priority logic 106 may estimate the magnitude of relative motion between a scene and an image capture device used to capture the scene. The relative motion may occur during a period of time between capturing a first image of the scene (e.g., the image 112 of FIG. 1) and capturing a second image of the scene (e.g., the image 114 of FIG. 1).

The system 580 may further include motion vector logic 170 coupled to the motion priority logic 106. The motion vector logic 170 may calculate the magnitude of a motion vector (e.g., the magnitude of the motion vector 115 of FIG. 1) associated with the first image feature block selected from the first image of the scene. The magnitude of the motion vector 115 may be calculated as a relative distance between a location of the first image feature block and a location of the second image feature block in the second image divided by the period of time between capturing the first image and capturing the second image. The locations of the image feature blocks in the first and second images may be measured relative to image frame boundaries associated with the respective images, as previously mentioned.

Any of the components previously described may be implemented in a number of ways, including embodiments in software. Software embodiments may be used in a simulation system, and the output of such a system may provide operational parameters to be used by the various apparatus described herein.

Thus, the apparatus 100; the priority logic 106; the ISA 108; the images 112, 114; the motion vector 115; the blocks 116, 116A, 117; 409; the exposure logic 118; the exposure control module 122; the image feature 123; the image capture logic 124; the feature selection module 126; the buffers 130, 154, 532; the DCT module 134; the MEM module 136; the sub-regions 142; the horizontal bands 144, 145; the areas 156, 157; the target matching logic 162; the motion vector logic 170; the systems 180, 380, 580; the frame rate adjustment module 184; the DCT coefficient matrix 200; the granularity continuum line 214; the noise cutoff line 220; the apparatus 300; the DCT coder module 310; the feature extraction module 316; the bands 230A, 230B, 240, 256, 266; the feature combination logic 320; the feature logic 326, 330, 336; the DCT coefficient sub-matrices 236, 250, 246, 260; the ISA elements 382; the matrix 403; the column 410; the (X,Y) grid 412; the luminance value 416; the pixels (X4,Y2), (X4,Y3), (X3,Y3), (X3,Y2), (X3,Y1), (X4,Y1), (X5,Y1), (X5,Y2), (X5,Y3); the gradient vectors 422,426,430,434,438, 442,446,450,454,700, 810A, 810B, 820,910, 1110; the apparatus 500; the vector calculator 510; the Sobel logic 514, 518; the Sobel matrices 610, 618; the Sobel values 614, 622; the pythagorean logic 522; the value 628; the arctangent logic 528; the angle 632; the gradient vector logic 540; the vector threshold logic 544; the threshold magnitude 814; the complement logic 548; the quantizer 554; the vector filter 558; the bins 1010, 1014, 1018; and the summation module 564 may all be characterized as "modules" herein.

The modules may include hardware circuitry, optical components, single or multi-processor circuits, memory circuits, software program modules and objects, firmware, and combinations thereof, as desired by the architect of the apparatus 100, 300, and 500 and of the system 180 and as appropriate for particular implementations of various embodiments.

The apparatus and systems of various embodiments may be useful in applications other than estimating a magnitude of relative motion between a scene and an image capture device and adjusting image capture parameters accordingly. Thus, various embodiments of the invention are not to be so limited. The illustrations of the apparatus 100, 300, and 500 and of the systems 180, 380, and 580 are intended to provide a general understanding of the structure of various embodiments. They are not intended to serve as a complete or otherwise limiting description of all the elements and features of apparatus and systems that might make use of the structures described herein.

The novel apparatus and systems of various embodiments may comprise and/or be included in electronic circuitry used in computers, communication and signal processing circuitry, single-processor or multi-processor modules, single or multiple embedded processors, multi-core processors, data switches, and application-specific modules including multilayer, multi-chip modules. Such apparatus and systems may further be included as sub-components within a variety of electronic systems, such as televisions, cellular telephones, personal computers (e.g., laptop computers, desktop computers, handheld computers, tablet computers, etc.), workstations, radios, video players, audio players (e.g., MP3 (Motion Picture Experts Group, Audio Layer 3) players), vehicles, medical devices (e.g., heart monitor, blood pressure monitor, etc.), set top boxes, and others. Some embodiments may include a number of methods.

Figure 12A:
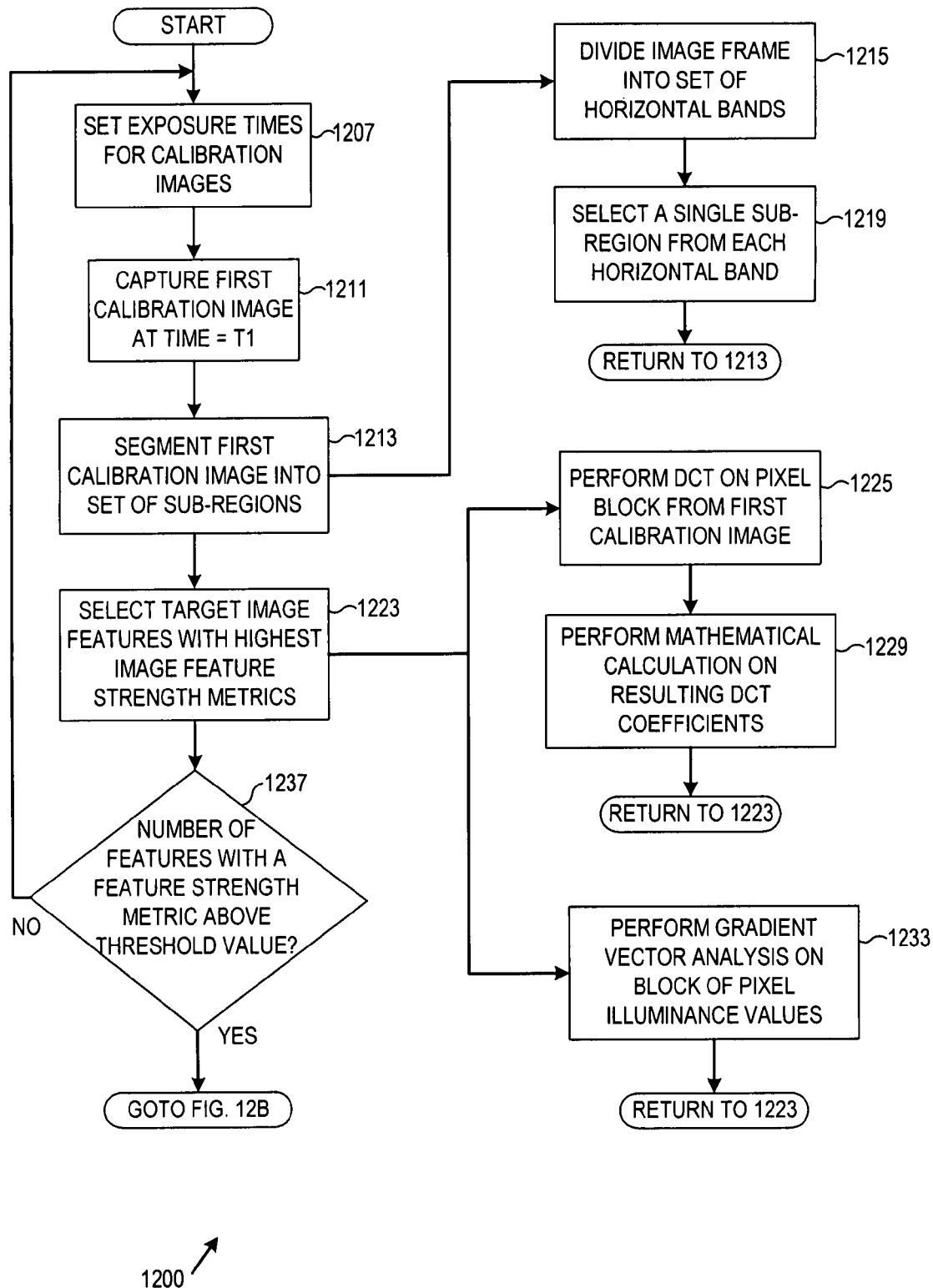
FIGS. 12A-12C are flow diagrams illustrating several methods according to various embodiments of the invention.
Figure 12B:
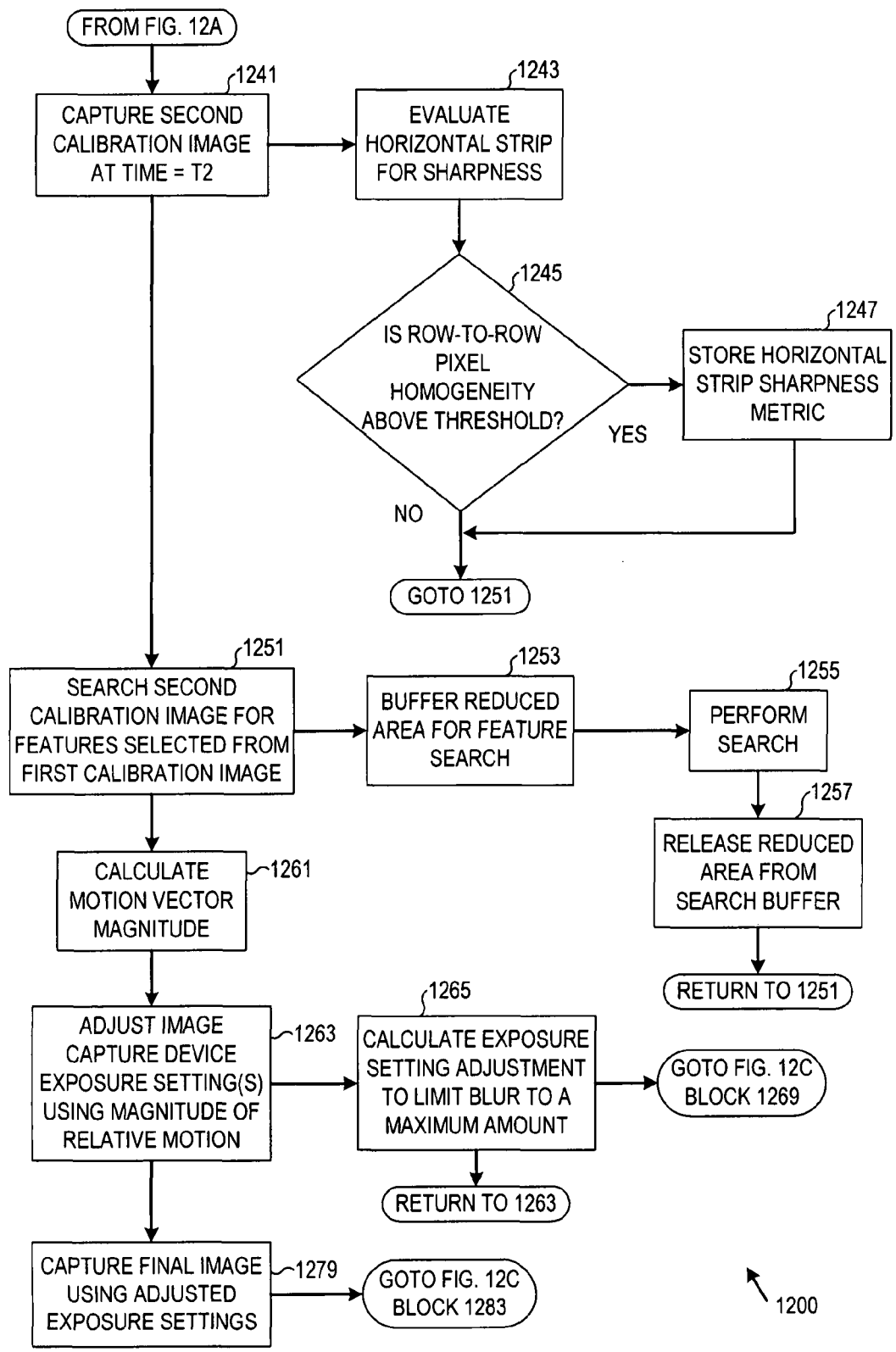
Figure 12C:
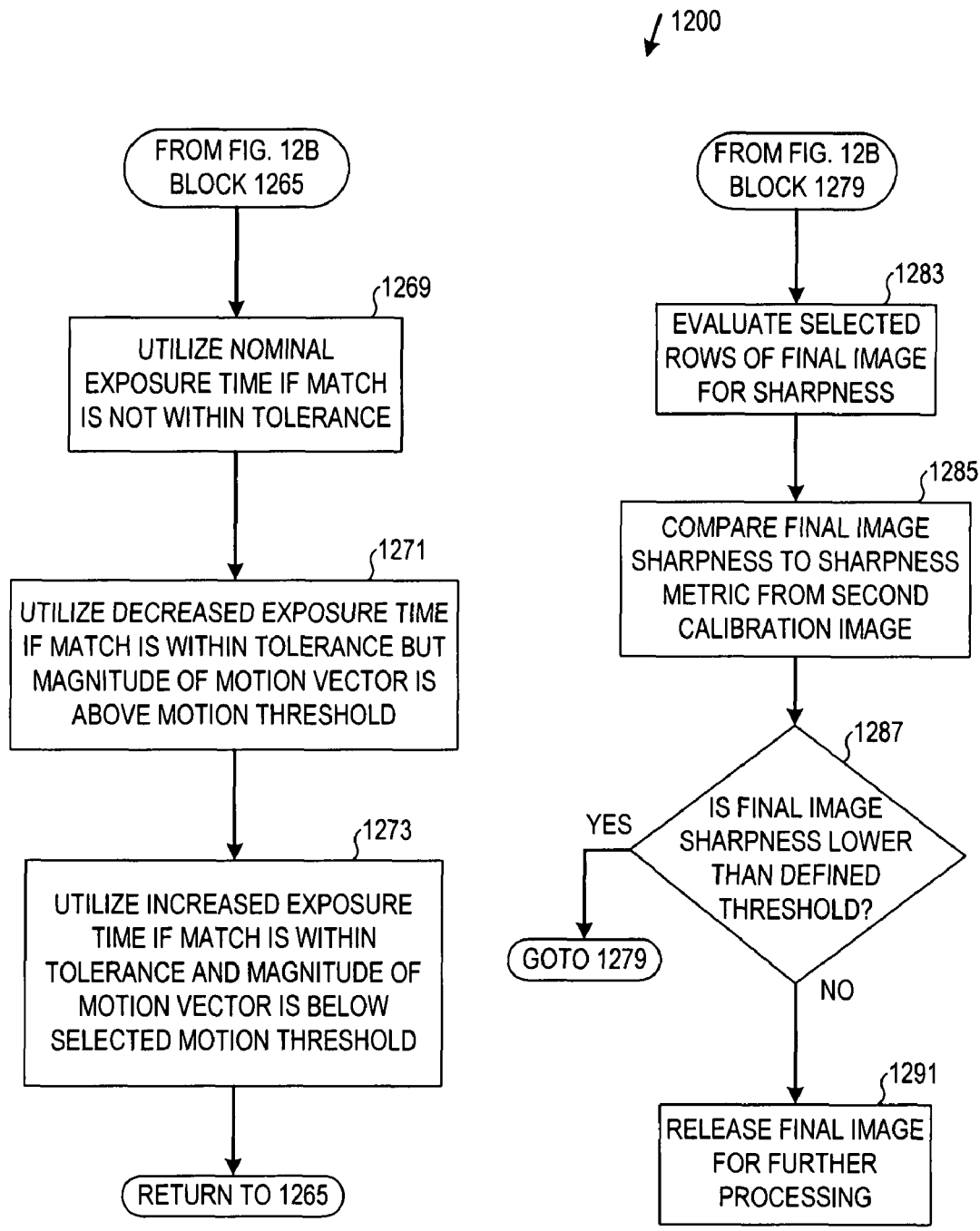

FIGS. 12A, 12B, and 12C are flow diagrams illustrating several methods according to various embodiments. A method 1200 may include estimating a magnitude of relative motion between a scene and an image capture device used to capture the scene. In some embodiments, the image capture device may comprise a digital camera. The magnitude of the relative motion may be used to adjust image capture parameters associated with the image capture device, including exposure settings such as aperture diameter, exposure time, and image signal amplification, among others.

The method 1200 may commence at block 1207 with setting a calibration exposure time used to capture calibration images such as a first calibration image and a second calibration image referred to below. The calibration exposure time may be shorter than an exposure time associated with capturing a final image, and may be calculated to decrease blur due to image motion and to provide image feature details in highlighted areas of the first and second calibration images.

The method 1200 may continue at block 1211 with capturing the first calibration image of the scene at a first time TI using the image capture device. One or more image feature blocks of pixels may be identified in the first calibration image, as follows. An image frame associated with the first calibration image may be segmented into a set of sub-regions (e.g., the set of sub-regions 143 of FIG. 1), at block 1213. The set of sub-regions may be selected such that sub-regions are distributed within the image frame according to a selected design. In some embodiments, distribution of the sub-regions may be accomplished by dividing the image frame into a set of horizontal bands (e.g., the set of horizontal bands 144 of FIG. 1), at block 1215. In an embodiment, the set of sub-regions may be selected such that a single sub-region is located in each horizontal band of the set of horizontal bands, at block 1219. Instead of, or in addition to the set of horizontal bands 144, some embodiments may designate vertical and/or diagonal bands for distribution of the sub-regions.

The method 1200 may also include selecting an image feature block of pixels from each sub-region of the set of sub-regions, at block 1223. For a given sub-region, some embodiments may select the image feature block of pixels having the highest image feature strength metric value among image feature strength metric values measured for each of a set of blocks of pixels from the given sub-region. Various methods may be used to derive the image feature strength metric value.

Some embodiments may perform a DCT operation on an image feature block of pixel luminance values associated with the first calibration image, at block 1225. The method 1200 may further include performing a mathematical calculation on a plurality of resulting DCT coefficients, at block 1229. The plurality of resulting DCT coefficients may be selected from low-frequency bands of a DCT coefficient matrix resulting from the DCT operation to derive the image feature strength metric value. The term "low-frequency bands" as used herein means areas in the upper-left quadrant of the DCT coefficient matrix. In some embodiments, the method 1200 may include performing a gradient vector analysis on the image feature block of pixel luminance values associated with the first calibration image to derive the value of the image feature strength metric associated with the image feature block of pixels, at block 1233.

The method 1200 may determine whether a sufficient number of image feature blocks of a minimum threshold image feature strength value are found in the first calibration image, at block 1237. If not, the first calibration image may be discarded and a new first calibration image captured beginning at block 1207. Alternatively, some embodiments may proceed to capture a final image using an automatic exposure setting or a user-selected exposure setting in the absence of finding a sufficient number (e.g., a preselected minimum number) of image feature blocks having a minimum threshold image feature strength value.

The method 1200 may continue at block 1241 with capturing a second calibration image of the scene at a second time T2. In some embodiments, the method 1200 may include evaluating pixels in a plurality of rows in a horizontal strip in the second calibration image for sharpness, at block 1243. The method 1200 may determine whether a sharpness metric value associated with each row of the plurality of rows in the horizontal strip falls within a selected range, at block 1245. That is, the method 1200 may determine whether a level of homogeneity of row-to-row pixel sharpness is above a threshold value. If so, a sharpness metric value associated with the horizontal strip may be stored, at block 1247.

The method 1200 may continue at block 1251 with searching an area of the second calibration image for a second image feature block of pixels corresponding to the first image feature block of the first calibration image. Various search methods may be utilized. In some embodiments, the search area may comprise a 40×40 pixel image block. Other search area sizes are possible. The method 1200 may include buffering a set of pixels from the search area in a search window buffer, at block 1253, while searching for the image feature, at block 1255. The method 1200 may also include releasing the set of pixels from the search window buffer prior to buffering a next set of pixels to search, at block 1257.

The method 1200 may include measuring a position of the first image feature block relative to a horizontal axis corresponding to a horizontal frame edge of the first calibration image and a vertical axis corresponding to a vertical frame edge of the first calibration image. Likewise, the position of the second image feature block may be measured relative to a horizontal axis corresponding to a horizontal frame edge of the second calibration image and a vertical axis corresponding to a vertical frame edge of the second calibration image.

The magnitude of relative motion between the scene and the image capture device during a period between the time T1 of capturing the first calibration image and the time T2 of capturing the second calibration image may be estimated. In some embodiments, the method 1200 may thus continue at block 1261 with calculating the magnitude of a motion vector associated with each image feature block identified in the first calibration image (e.g., the first image feature block). The motion vector magnitude may be calculated as a relative distance between the first image feature block and the second image feature block divided by the time difference between T1 and T2.

The method 1200 may include adjusting one or more exposure settings associated with the image capture device using the estimate of the relative motion between the scene and the image capture device, at block 1263. The exposure settings may comprise an exposure time, an aperture size, an amplification factor associated with a plurality of image sensor array signals, or a flash duration, among others.

The method 1200 may also include calculating an amount of exposure setting adjustment used to limit image blur due to the relative motion between the scene and the image capture device to a desired maximum amount of blur, at block 1265. Some embodiments may, for example, set an exposure time to a value corresponding to the desired maximum amount of blur expressed as a distance divided by the magnitude of the relative motion between the scene and the image capture device. The maximum amount of blur may be expressed as a number of pixel widths.

Some embodiments may utilize a nominal exposure to capture the final image if a match between the first image feature block of pixels and the second image feature block of pixels is not within a selected match tolerance, at block 1269. "Match tolerance" in this context means a maximum amount of acceptable mismatch between luminance values associated with corresponding pixels from the first image feature block and the second image feature block. Some embodiments may calculate the mismatch as a sum of absolute differences between luminance values of the candidate image feature block and the first image feature block 116. Other embodiments may use other metrics (e.g., sum of squares of differences) as a measure of mismatch. A "nominal exposure" means a combination of exposure parameters including exposure time, aperture setting, and/or an ISA element amplification factor calculated and programmed into the image capture device to provide an average exposure based upon a sensed luminance level. That is, the image capture device may default to a traditional automatic exposure setting if motion matching means described herein are unable to reliably estimate motion vector magnitudes.

A decreased exposure time may be used if the match between the first image feature block of pixels and the second image feature block of pixels is within the match tolerance but the magnitude of the motion vector is above a motion threshold, at block 1271. "Decreased exposure time" means an exposure time shorter than the exposure time associated with a traditional automatic exposure setting. An increased exposure time may be used if the match between the first image feature block of pixels and the second image feature block of pixels is within the match tolerance and the magnitude of the motion vector is below the motion threshold, at block 1273. "Increased exposure time" means an exposure time longer than the exposure time associated with a traditional automatic exposure setting.

The method 1200 may further include capturing a final image, at block 1279. The final image may be captured using the adjusted exposure settings, thus taking into consideration the relative motion between the scene and the image capture device. After the final image is captured, some embodiments may include evaluating pixels in a selected number of rows of the final image for sharpness, at block 1283.

The method 1200 may proceed at block 1285 with comparing the final image sharpness to the sharpness metric value associated with the horizontal strip of the second calibration image. The method 1200 may then determine whether the final image sharpness is lower than the sharpness metric value associated with the horizontal strip of the second calibration image by greater than a maximum amount, at block 1287. An excessively low sharpness value in the final image may indicate that the motion matching techniques failed to determine correct exposure. In such case, one of two possible paths may be followed. The method 1200 may sequence back to block 1279 to re-capture the final image using a shorter exposure time than previously used. Alternatively, the method 1200 may sequence back to block 1207 to begin anew. If the final image sharpness is above the afore-described minimum threshold, the method 1200 may terminate at block 1291 with releasing the final image for further processing.

Figure 13:
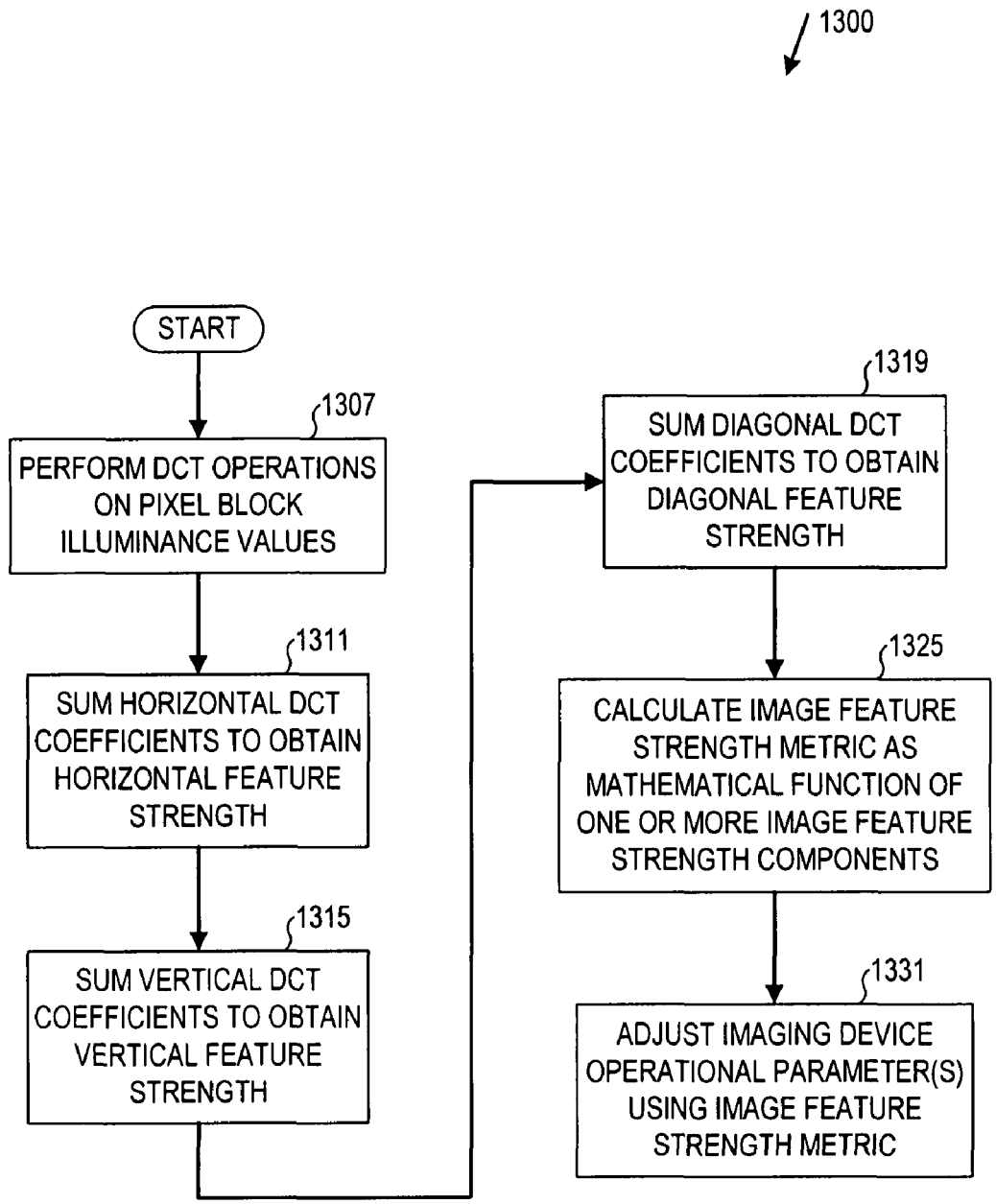
FIG. 13 is a flow diagram illustrating various methods according to various embodiments of the invention.

FIG. 13 is a flow diagram illustrating several methods according to various embodiments of the present invention. A method 1300 may utilize DCT operations to identify image feature blocks in an image and to derive an image feature strength metric for each such image feature block. The image feature strength metric may be utilized by an imaging device to adjust device operational parameters, among other uses. A mathematical operation may be performed on a plurality of DCT coefficients selected from low-frequency bands of a DCT coefficient matrix to derive the value of the image feature strength metric.

The method 1300 may commence at block 1307 with performing DCT operations on a set of luminance values associated with a block of pixels selected from the image to obtain the DCT coefficient matrix (e.g., the DCT coefficient matrix 200 of FIG. 2). The method 1300 may continue at block 1311 with summing horizontal DCT coefficients to obtain a horizontal image feature strength component. The horizontal DCT coefficients may be located in a sub-matrix in a horizontal band of the DCT coefficient matrix adjacent a lowest-frequency sub-matrix. Turning back to FIG. 2, it can be seen that the horizontal DCT coefficients may be located in the sub-matrix 236 in the horizontal band 240 of the DCT coefficient matrix 200 adjacent a lowest-frequency sub-matrix 246.

The method 1300 may include summing vertical DCT coefficients to obtain a vertical image feature strength component, at block 1315. The vertical DCT coefficients may be located in a sub-matrix in a vertical band of the DCT coefficient matrix adjacent a lowest-frequency sub-matrix. For example, as seen in FIG. 2, the vertical DCT coefficients may be located in the sub-matrix 250 in the vertical band 256 of the DCT coefficient matrix 200 adjacent the lowest-frequency sub-matrix 246.

The method 1300 may further include summing diagonal DCT coefficients to obtain a diagonal image feature strength component, at block 1319. The diagonal DCT coefficients may be located in a sub-matrix in a diagonal band of the DCT coefficient matrix adjacent a lowest-frequency sub-matrix. For example, in FIG. 2, the diagonal DCT coefficients may be located in the sub-matrix 260 in the diagonal band 266 of the DCT coefficient matrix 200 adjacent the lowest-frequency sub-matrix 246.

The method 1300 may also include calculating a mathematical function of one or more of the horizontal image feature strength component, the vertical image feature strength component, and the diagonal image feature strength component to obtain the image feature strength metric associated with the block of pixels, at block 1325. The mathematical function may comprise one or more sums, differences, products, or other functions of two or more of the horizontal image feature strength component, the vertical image feature strength component, and the diagonal image feature strength component. The method 1300 may terminate with using the image feature strength metric to adjust one or more operational parameters associated with an imaging device, at block 1331.

Figure 14A:
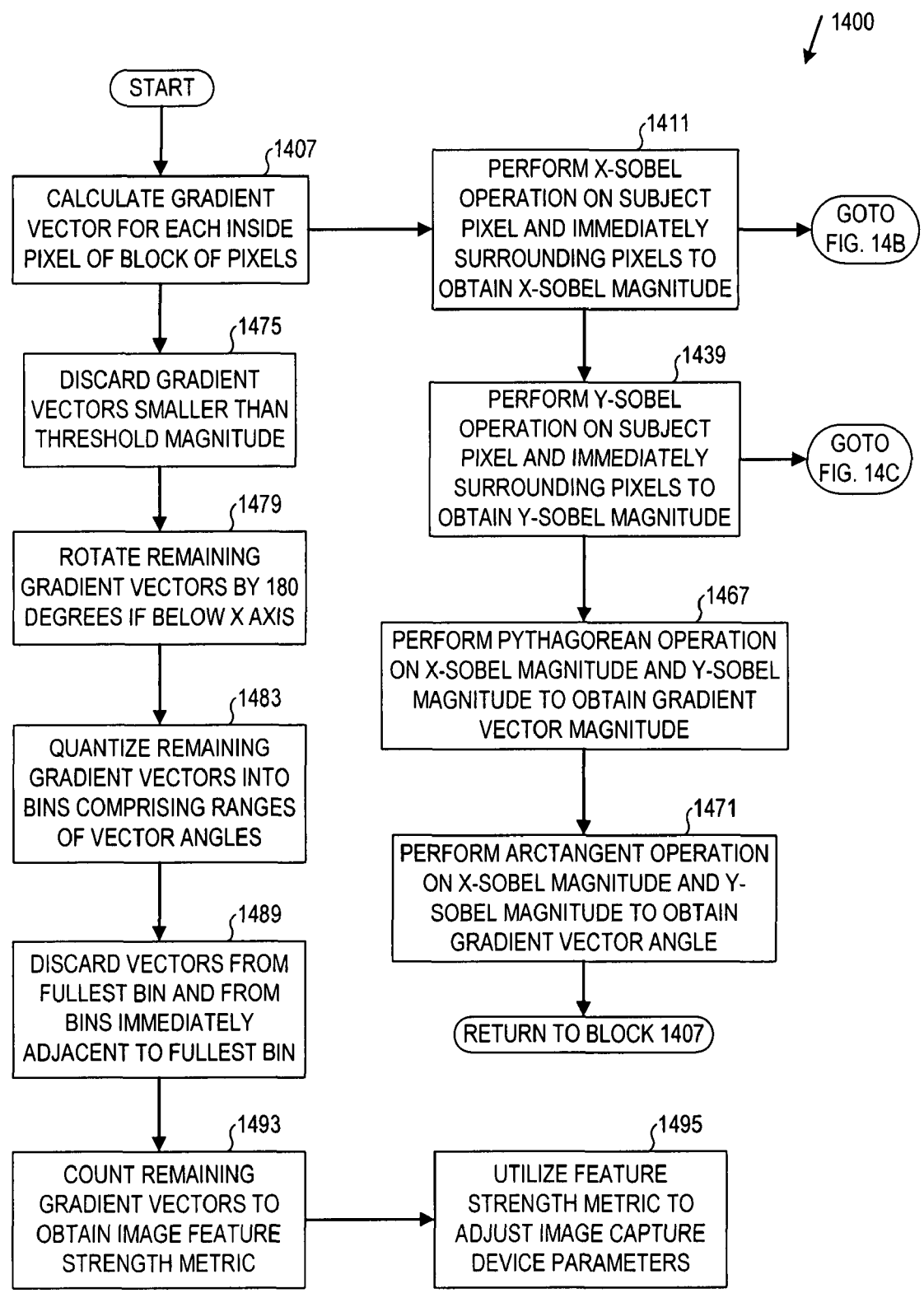
FIGS. 14A-14C are flow diagrams according to various embodiments of the invention.
Figure 14B:
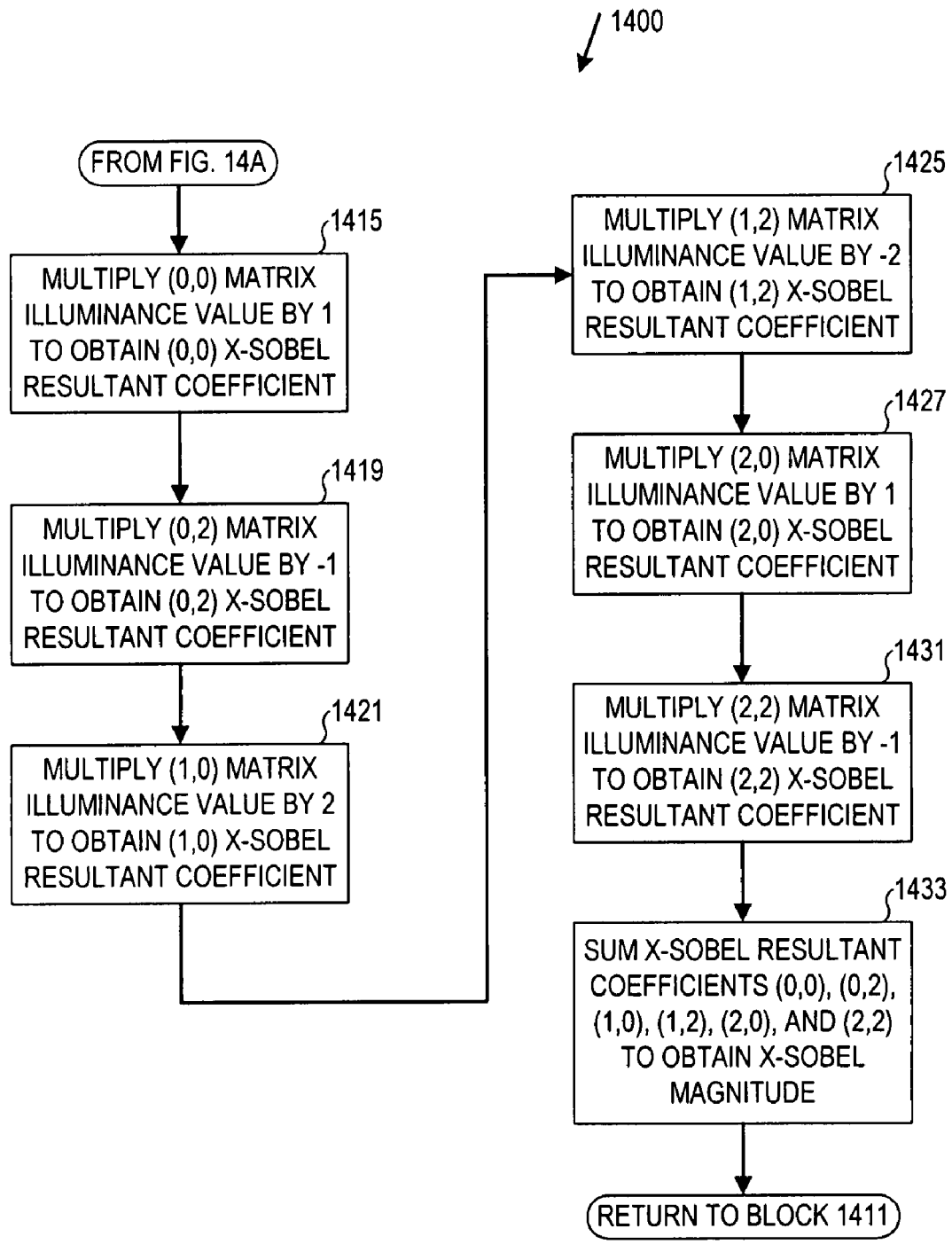
Figure 14C:
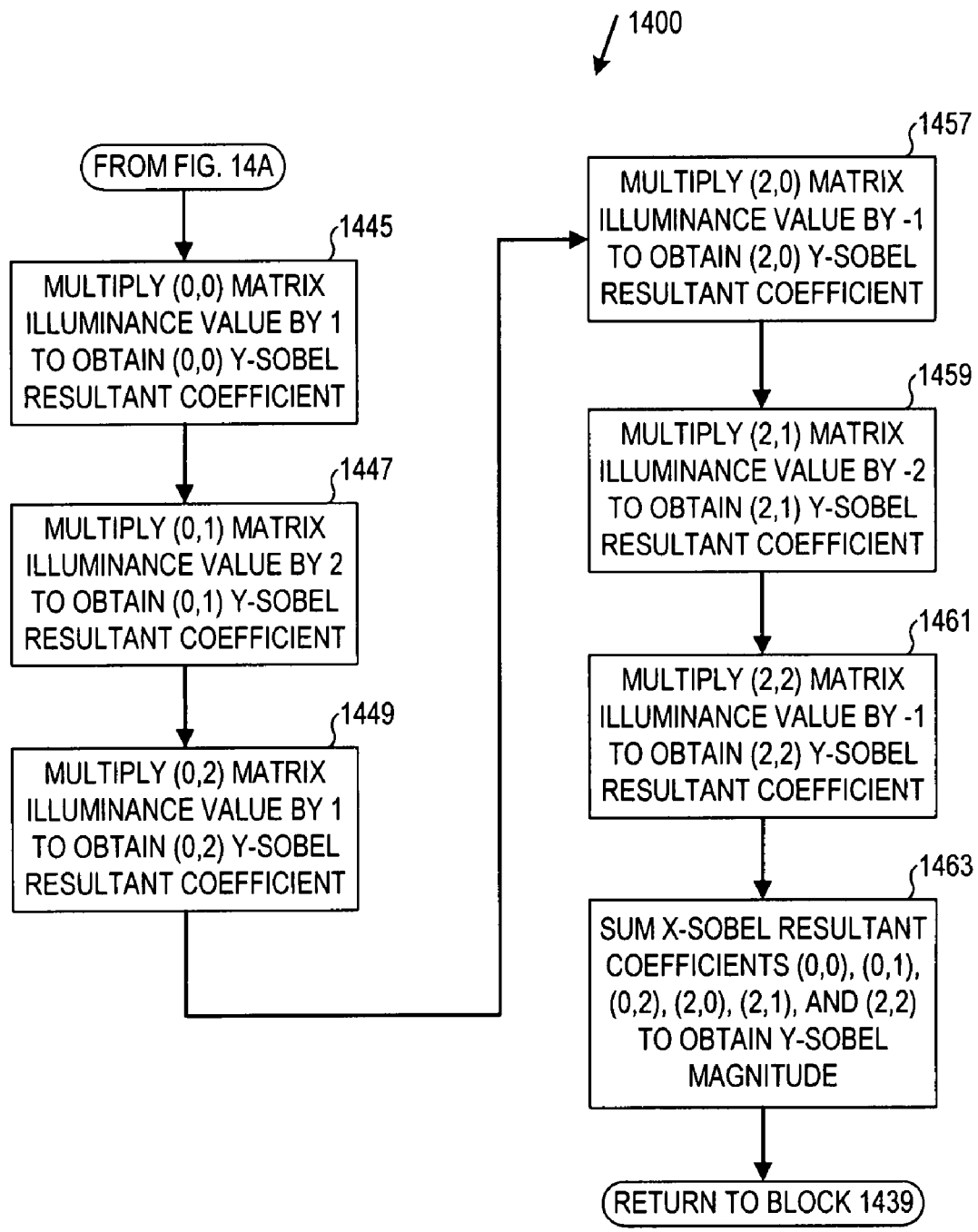

FIGS. 14A, 14B, and 14C are flow diagrams illustrating several methods according to various embodiments of the present invention. A method 1400 may include performing a gradient vector analysis on a block of pixels selected from an image to derive the value of an image feature strength metric associated with the block of pixels. In some embodiments, gradient vectors may be calculated according to a Sobel technique.

The method 1400 may commence at block 1407 with calculating a gradient vector for each pixel within the block of pixels. Some embodiments may refrain from calculating gradient vectors for pixels located along a periphery of the block of pixels. The method 1400 may include performing an X-Sobel operation on pixel luminance values associated with a subject pixel selected from the block of pixels and eight pixels immediately adjacent to the subject pixel in a 3×3 subject pixel matrix, at block 1411. The pixel luminance values may be organized into a subject pixel luminance matrix. An X-Sobel value may be obtained as a result. For purposes of identifying matrix elements in the following discussion, the 3×3 subject pixel matrix may be organized as follows:
(0,0) (1,0) (2,0)
(0,1) (1,1) (2,1)
(0,2) (1,2) (2,2)

The subject pixel luminance matrix may be convolved by an X-Sobel matrix to obtain the X-Sobel value. The X-Sobel operation may include multiplying a (0,0) subject pixel matrix luminance value by one to obtain a (0,0) X-Sobel resultant coefficient, at block 1415. A (0,2) subject pixel matrix luminance value may be multiplied by a negative one to obtain a (0,2) X-Sobel resultant coefficient, at block 1419. A (1,0) subject pixel matrix luminance value may be multiplied by two to obtain a (1,0) X-Sobel resultant coefficient, at block 1421. A (1,2) subject pixel matrix luminance value may be multiplied by a negative two to obtain a (1,2) X-Sobel resultant coefficient, at block 1425. A (2,0) subject pixel matrix luminance value may be multiplied by one to obtain a (2,0) X-Sobel resultant coefficient, at block 1427. A (2,2) subject pixel matrix luminance value may be multiplied by a negative one to obtain a (2,2) X-Sobel resultant coefficient, at block 1431. The method 1400 may also include summing the (0,0) X-Sobel resultant coefficient, the (0,2) X-Sobel resultant coefficient, the (1,0) X-Sobel resultant coefficient, the (1,2) X-Sobel resultant coefficient, the (2,0) X-Sobel resultant coefficient, and the (2,2) X-Sobel resultant coefficient to obtain the X-Sobel value, at block 1433.

The method 1400 may continue at block 1439 with performing a Y-Sobel operation on pixel luminance values associated with the subject pixel and the eight pixels immediately adjacent to the subject pixel in the 3×3 subject pixel matrix. A Y-Sobel value may be obtained as a result.

The subject pixel luminance matrix may be convolved by a Y-Sobel matrix to obtain the Y-Sobel value. The Y-Sobel operation may include multiplying a (0,0) subject pixel matrix luminance value by one to obtain a (0,0) Y-Sobel resultant coefficient, at block 1445. A (0,1) subject pixel matrix luminance value may be multiplied by two to obtain a (0,1) Y-Sobel resultant coefficient, at block 1447. A (0,2) subject pixel matrix luminance value may be multiplied by one to obtain a (0,2) Y-Sobel resultant coefficient, at block 1449. A (2,0) subject pixel matrix luminance value may be multiplied by negative one to obtain a (2,0) Y-Sobel resultant coefficient, at block 1457. A (2,1) subject pixel matrix luminance value may be multiplied by negative two to obtain a (2,1) Y-Sobel resultant coefficient, at block 1459. A (2,2) subject pixel matrix luminance value may be multiplied by negative one to obtain a (2,2) Y-Sobel resultant coefficient, at block 1461. The method 1400 may also include summing the (0,0) Y-Sobel resultant coefficient, the (0,1) Y-Sobel resultant coefficient, the (0,2) Y-Sobel resultant coefficient, the (2,0) Y-Sobel resultant coefficient, the (2,1) Y-Sobel resultant coefficient, and the (2,2) Y-Sobel resultant coefficient to obtain the Y-Sobel value, at block 1463.

The method 1400 may include performing a Pythagorean operation on the X-Sobel value and the Y-Sobel value to obtain a value of a gradient vector associated with the subject pixel, at block 1467. The method 1400 may also perform an arctangent operation on the X-Sobel value and the Y-Sobel value to obtain an angle associated with the gradient vector, at block 1471.

The method 1400 may continue at block 1475 with discarding resulting gradient vectors smaller than a threshold magnitude. The latter operation may exclude low-gradient pixels from contributing to the image feature strength metric calculation. The method 1400 may include rotating remaining gradient vectors falling below the X axis by 180 degrees, at block 1479. The method 1400 may also include quantizing the remaining gradient vectors into bins comprising ranges of vector angles, at block 1483. The method 1400 may further include discarding remaining gradient vectors from a bin containing more remaining gradient vectors than any other bin and from bins immediately adjacent to the bin containing more gradient vectors than any other bin, at block 1489. A final set of gradient vectors may remain in one or more bins. The method 1400 may include counting the number gradient vectors in the final set of gradient vectors to obtain the value of the image feature strength metric associated with the block of pixels, at block 1493. The method 1400 may terminate at block 1495 with using the image feature strength metric value to adjust one or more operational parameters associated with an image capture device.

It should be noted that the activities described herein may be executed in an order other than the order described. The various activities described with respect to the methods identified herein may also be executed in repetitive, serial, and/or parallel fashion.

A software program may be launched from a computer-readable medium in a computer-based system to execute functions defined in the software program. Various programming languages may be employed to create software programs designed to implement and perform the methods disclosed herein. The programs may be structured in an object-oriented format using an object-oriented language such as Java or C++. Alternatively, the programs may be structured in a procedure-oriented format using a procedural language, such as assembly or C. The software components may communicate using a number of mechanisms well known to those skilled in the art, such as application program interfaces or inter-process communication techniques, including remote procedure calls. The teachings of various embodiments are not limited to any particular programming language or environment.

The apparatus, systems, and methods disclosed herein may estimate a magnitude of relative motion between a scene and an image capture device used to capture the scene. Some embodiments may utilize DCT and/or Sobel gradient techniques to identify an image feature block in successive test frames. Motion vectors may be calculated between corresponding image feature blocks as found in the successive test frames. The magnitude of relative motion derived thereby may be used to adjust image capture parameters associated with the image capture device, including exposure settings. Implementing the apparatus, systems, and methods described herein may enable the use of higher-density ISAs with smaller sensor elements by increasing exposure times while limiting image blur to a maximum selected amount.

The accompanying drawings that form a part hereof show, by way of illustration and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims and the full range of equivalents to which such claims are entitled.

Such embodiments of the inventive subject matter may be referred to herein individually or collectively by the term "invention" merely for convenience and without intending to voluntarily limit the scope of this application to any single invention or inventive concept, if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments and other embodiments not specifically described herein will be apparent to those of skill in the art upon reviewing the above description.

The Abstract of the Disclosure is provided to comply with 37 C.F.R. §1.72(b) requiring an abstract that will allow the reader to quickly ascertain the nature of the technical disclosure. It is submitted with the understanding that it will not be used to interpret or limit the scope or meaning of the claims. In the foregoing Detailed Description, various features are grouped together in a single embodiment for the purpose of streamlining the disclosure. This method of disclosure is not to be interpreted to require more features than are expressly recited in each claim. Rather, inventive subject matter may be found in less than all features of a single disclosed embodiment. Thus the following claims are hereby incorporated into the Detailed Description, with each claim standing on its own as a separate embodiment.

What is claimed is:

1. An apparatus, comprising:
motion priority logic to estimate a magnitude of relative motion between an entire scene and an image capture device used to capture the scene, the relative motion occurring during a time period between a time of capturing a first calibration image of the scene and a time of capturing a second calibration image of the scene, wherein the motion priority logic is configured to use the first and second calibration images of the scene to estimate the magnitude of relative motion between the entire scene and the image capture device;
final image exposure logic to calculate at least one exposure setting associated with the image capture device using the magnitude of relative motion between the entire scene and the image capture device;
an image feature selection module coupled to the motion priority logic to identify a first image feature block of pixels in the first calibration image and to store the first image feature block of pixels in an image feature buffer, wherein the image feature selection module is configured to identify the first image feature block of pixels based on an image feature strength metric value that represents a measurement of one or more characteristics other than motion that render the first image feature block of pixels distinguishable from other image features and background pixels in the first calibration image;
target matching logic coupled to the motion priority logic to search an area of the second calibration image for a second image feature block, wherein the second image feature block matches the first image feature block better than any other image feature block located within the area of the second calibration image, and wherein the area of the second calibration image corresponds to an area of the first calibration image containing the first image feature block; and
motion vector logic coupled to the motion priority logic to calculate a magnitude of a vector associated with the first image feature block as a relative distance between a location of the first image feature block and a location of the second image feature block, the relative distance divided by the time period between capturing the first calibration image and capturing the second calibration image.

2. A method, comprising:
capturing a first calibration image of a scene at a first time (T1) using an image capture device;

capturing a second calibration image of the scene at a second time (T2);

estimating a magnitude of relative motion between the entire scene and the image capture device during a period between the first time and the second time using the first calibration image and the second calibration image, wherein there is at least one object in the scene that is moving within the scene and wherein estimating the magnitude of relative motion between the entire scene and the image capture device does not include determining which object in the scene is moving the fastest relative to the scene;

adjusting an exposure setting using the magnitude of relative motion between the entire scene and the image capture device as estimated;

capturing a final image using the adjusted exposure setting; and setting an exposure time to a value corresponding to a desired maximum amount of blur expressed as a distance divided by the magnitude of relative motion between the entire scene and the image capture device.

* * * * *